(12) United States Patent
Nose (10) Patent No.: US 11,281,204 B2
(45) Date of Patent: Mar. 22, 2022

(54) ESTIMATING DEVICE AND SYSTEM

(71) Applicant: FANUC CORPORATION, Yamanashi (JP)

(72) Inventor: Shingo Nose, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 150 days.

(21) Appl. No.: 16/910,866

(22) Filed: Jun. 24, 2020

(65) Prior Publication Data

US 2021/0003999 A1    Jan. 7, 2021

(30) Foreign Application Priority Data

Jul. 2, 2019   (JP) .............................. JP2019-123444

(51) Int. Cl.
*G05B 23/02*    (2006.01)
*G05B 19/418*   (2006.01)

(52) U.S. Cl.
CPC ..... *G05B 23/0272* (2013.01); *G05B 19/4183* (2013.01); *G05B 19/4184* (2013.01); *G05B 23/0275* (2013.01)

(58) Field of Classification Search
None
See application file for complete search history.

(56) References Cited

FOREIGN PATENT DOCUMENTS

JP    2002-312011 A    10/2002

*Primary Examiner* — Carlos R Ortiz Rodriguez
(74) *Attorney, Agent, or Firm* — Robert P. Michal, Esq.; Carter, DeLuca & Farrell LLP (57) ABSTRACT

An estimating device includes a storage unit that stores in association with each other state history information showing, as a history, a state of electrical equipment in which an abnormality has occurred, and cause history information showing, as a history, a cause of the abnormality, an acquisition unit that acquires state information indicating the state of the electrical equipment in which the abnormality has occurred, a detection unit that detects, from among a plurality of the state history information stored in the storage unit, at least one of the state history information that is similar to the state information acquired by the acquisition unit, and a notification unit that issues a notification concerning the cause of the abnormality, on the basis of the cause history information that is associated with the state history information detected by the detection unit.

14 Claims, 9 Drawing Sheets

ESTIMATING DEVICE AND SYSTEM

CROSS-REFERENCE TO RELATED APPLICATION

This application is based upon and claims the benefit of priority from Japanese Patent Application No. 2019-123444 filed on Jul. 2, 2019, the contents of which are incorporated herein by reference.

BACKGROUND OF THE INVENTION

Field of the Invention

The present invention relates to an estimating device and a system for estimating the cause of an abnormality of electrical equipment included in a machine tool.

Description of the Related Art

In the case that an abnormality has occurred in a machine tool, an operator is notified that such an abnormality has been generated. In Japanese Laid-Open Patent Publication No. 2002-312011, a system is disclosed in which it is possible to judge, to some extent, the situation at the time of an alarm, by determining a level of risk on the basis of signals indicative of operating states of a video camera, a microphone, a thermometer, a vibration meter, etc., and transmitting the determined level of risk to a mobile phone or the like.

SUMMARY OF THE INVENTION

However, to make an appropriate judgment of the situation, experience is required, and further, even if a proper judgment of the situation is made, time and effort is required in order to investigate the actual cause of the abnormality.

Thus, an object of the present invention is to provide an estimating device and a system which are capable of facilitating an investigation of the cause of an abnormality.

A first aspect of the present invention is characterized by an estimating device that estimates a cause of an abnormality of electrical equipment included in a machine tool, the estimating device comprising:

a storage unit configured to store in association with each other state history information showing, as a history, a state of the electrical equipment in which an abnormality has occurred, and cause history information showing, as a history, a cause of the abnormality;

an acquisition unit configured to acquire state information indicating the state of the electrical equipment in which the abnormality has occurred;

a detection unit configured to detect, from among a plurality of the state history information stored in the storage unit, at least one of the state history information that is similar to the state information acquired by the acquisition unit; and a notification unit configured to issue a notification concerning the cause of the abnormality, on a basis of the cause history information that is associated with the state history information detected by the detection unit.

A second aspect of the present invention is characterized by a system equipped with a plurality of machine tools, a management server configured to manage each of the plurality of machine tools, and a mobile terminal configured to communicate with at least one of the management server and the plurality of machine tools, the system comprising:

a storage unit configured to store in association with each other state history information showing, as a history, a state of electrical equipment which is included in each of the machine tools and in which an abnormality has occurred, and cause history information showing, as a history, a cause of the abnormality;

an acquisition unit configured to acquire state information indicating the state of the electrical equipment which is included in each of the machine tools and in which the abnormality has occurred;

a detection unit configured to detect, from among a plurality of the state history information stored in the storage unit, at least one of the state history information that is similar to the state information acquired by the acquisition unit; and a notification unit configured to issue a notification concerning the cause of the abnormality, on a basis of the cause history information that is associated with the state history information detected by the detection unit.

According to the present invention, since a notification is issued concerning the cause of an abnormality associated with the state of the electrical equipment in which such an abnormality has occurred, the cause of the abnormality can be easily investigated.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of the present invention will be presented and described in detail below with reference to the accompanying drawings.

EMBODIMENT

Figure 1:
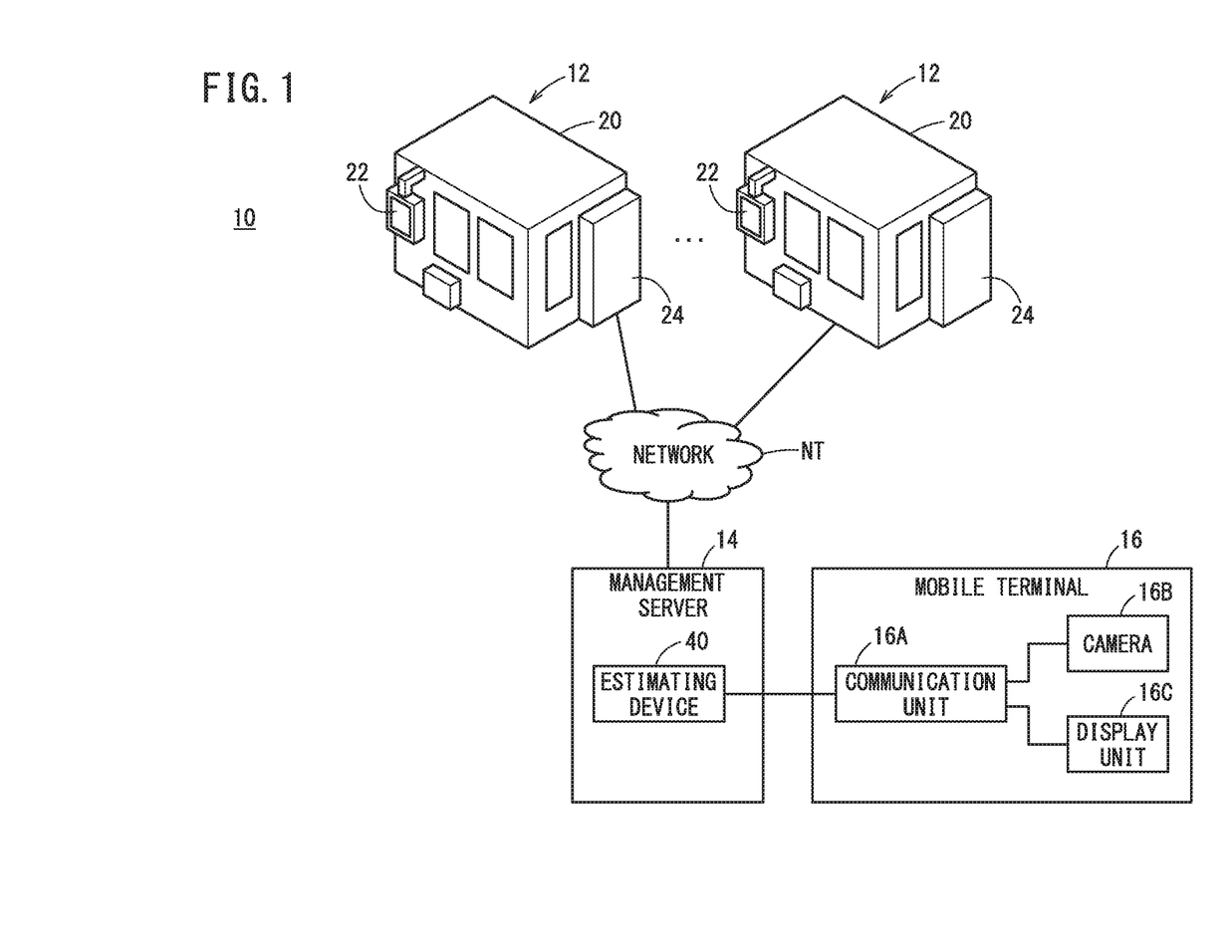
FIG. 1 is a schematic diagram showing a system according to an embodiment of the present invention.

A system 10 according to the present embodiment will be described with reference to FIG. 1. The system 10 according to the present embodiment is equipped with a plurality of machine tools 12, a management server 14 that manages each of the plurality of machine tools 12, and a mobile terminal 16. The plurality of machine tools 12 and the management server 14 are connected through a network NT.

The management server 14 and the mobile terminal 16 are connected so as to be capable of communicating with each other.

Each of the plurality of machine tools 12 performs machining on an object that is subjected to machining. The type of at least one of the plurality of machine tools 12 may be different from that of the other machine tools 12. As examples of types of the machine tools 12, there may be cited a lathing machine, a machining center, an electric discharge machine, an injection molding machine, and the like. Each of the plurality of machine tools 12 includes a protective cover 20 in which a machine tool main body is accommodated. On outer walls of the protective cover 20, there are provided a display unit 22 that displays information, and a control panel 24 in which a portion of a plurality of electrical equipment included in the machine tool 12 is accommodated.

The management server 14 manages each of the plurality of machine tools 12. The management server 14 exchanges various types of information with each of the plurality of machine tools 12 (numerical control devices), and on the basis of such information, manages each of the plurality of machine tools 12. The management server 14 includes an estimating device 40 that estimates, for each of the machine tools 12, the cause of an abnormality of the electrical equipment included in the machine tool 12.

The mobile terminal 16 is a portable information terminal device having versatility. As specific examples of the mobile terminal 16, there may be cited a mobile phone, a tablet terminal, or the like. The mobile terminal 16 includes a communication unit 16A that communicates with the management server 14, a camera 16B that captures images of a subject, and a display unit 16C that displays information.

Next, the electrical equipment accommodated in the control panel 24 will be described with reference to FIG. 2. According to the present embodiment, a plurality of servo amplifiers $26_1$ to $26_m$ and a plurality of I/O (Input/Output) devices $28_1$ to $28_n$ are accommodated in the control panel 24. The subscript "m" of the servo amplifier $26_n$ and the subscript "n" of the I/O device $28_n$ are integers greater than or equal to two. The subscript "m" and the subscript "n" may be the same number or may be different numbers. Moreover, in FIG. 2, an exemplary case is illustrated in which the subscript "m" is "7", and an exemplary case is illustrated in which the subscript "n" is "18".

Figure 2:
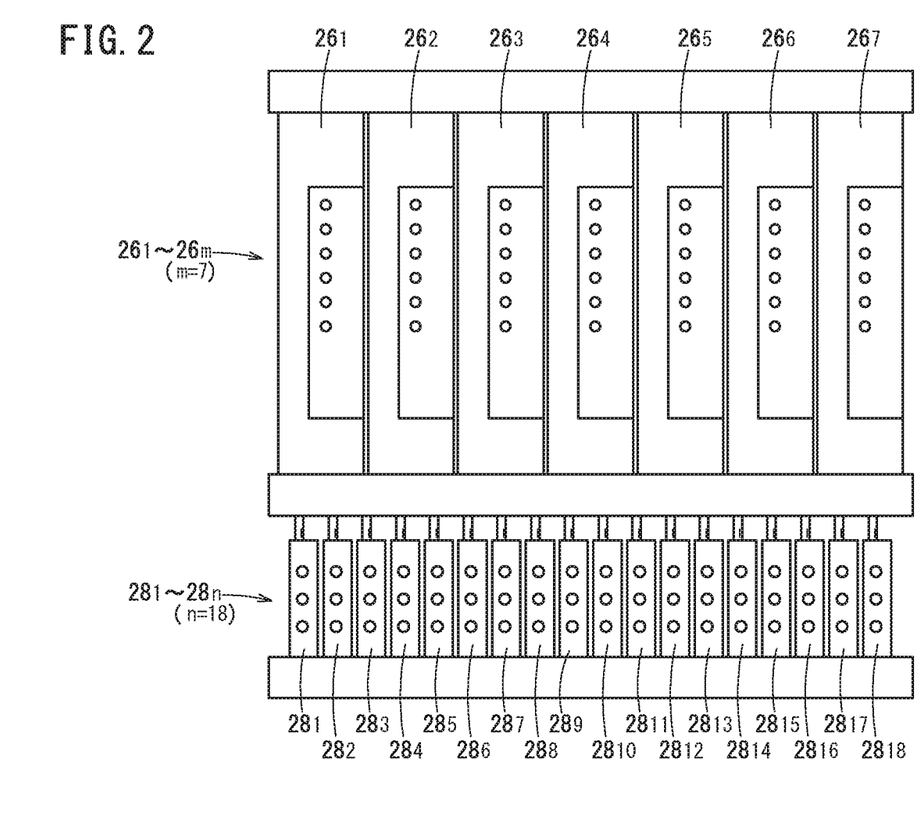
FIG. 2 is a diagram illustrating the appearance of electrical equipment accommodated in a control panel.

In the example shown in FIG. 2, the plurality of servo amplifiers $26_1$ to $26_m$ are arranged alongside each other at a predetermined interval in one direction (a direction along a horizontal plane). The plurality of servo amplifiers $26_1$ to $26_m$ are connected in series (in a daisy chain connection), and the servo amplifier $26_1$ on one end side of the connected plurality of servo amplifiers $26_1$ to $26_m$ is connected to the numerical control device that controls the machine tool main body.

In the example shown in FIG. 2, the plurality of I/O devices $28_1$ to $28_n$ are arranged at a predetermined interval in one direction (a direction along the horizontal plane) on the lower side (a side toward which gravity acts) of the plurality of servo amplifiers $26_1$ to $26_m$. The I/O devices $28_1$ to $28_n$ are connected in series (in a daisy chain connection), and the I/O device $28_1$ on one end side of the plurality of connected I/O devices $28_1$ to $28_n$ is connected to the numerical control device.

Figure 3:
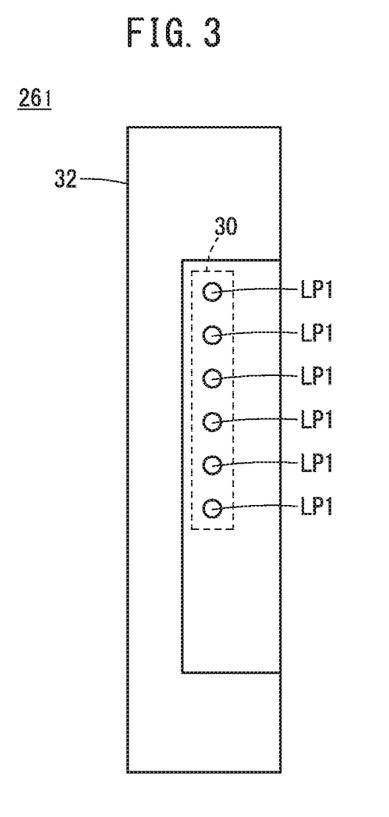
FIG. 3 is a diagram illustrating the external appearance of a servo amplifier.

Next, the servo amplifier $26_1$ will be described with reference to FIG. 3. Moreover, since the servo amplifiers $26_2$ to $26_m$ have the same configuration as the servo amplifier $26_1$, descriptions of the respective servo amplifiers $26_2$ to $26_m$ will be omitted.

The servo amplifier $26_1$ drives a motor. The servo amplifier $26_1$ is connected in a one-to-one relationship to any one of a plurality of motors provided in the machine tool main body, and drives the motor in accordance with control (command values) of the numerical control device. The servo amplifier $26_1$ includes a state presentation unit 30 that presents the state of the servo amplifier $26_1$.

The state presentation unit 30 includes lamps LP1, which correspond to a plurality of types of abnormalities, on the surface of a casing 32 of the servo amplifier $26_1$. According to the present embodiment, as the types of abnormalities, there are included an excessive current, overheating, a power supply malfunction, a communication failure, and a fuse disconnection.

In a state in which no abnormality has occurred (in a normal state), the servo amplifier $26_1$ turns on each of the plurality of lamps LP1 of the state presentation unit 30 in a first color such as green. Consequently, the servo amplifier $26_1$ causes the state presentation unit 30 to present the fact that the servo amplifier $26_1$ is in a normal state.

In contrast thereto, in the case that an abnormality has been detected in at least one of an excessive current, overheating, a power supply malfunction, a communication failure, and a fuse disconnection, the servo amplifier $26_1$ causes the lamp LP1 corresponding to the type of detected abnormality to be turned on in a second color such as red, for example. Consequently, the servo amplifier $26_1$ causes the state presentation unit 30 to present the fact that an abnormality has occurred in the servo amplifier $26_1$, as well as the type of abnormality.

Moreover, in the case of the normal state, the servo amplifier $26_1$ may turn on (or turn off) each of the plurality of lamps LP1, and in the case that at least one of the abnormalities is detected, the servo amplifier $26_1$ may turn off (or turn on) the lamp LP1 corresponding to the type of detected abnormality.

In the case that an abnormality other than a communication failure is detected, the servo amplifier $26_1$ generates an abnormality signal indicating the abnormality, and outputs the generated abnormality signal to the numerical control device. It should be noted that the servo amplifiers $26_2$ to $26_m$ other than the servo amplifier $26_1$, which is the first servo amplifier connected to the numerical control device, output abnormality signals to the numerical control device via the servo amplifiers $26_1$ to $26_{(m-1)}$ located on the side closer to the numerical control device than themselves.

Figure 4:
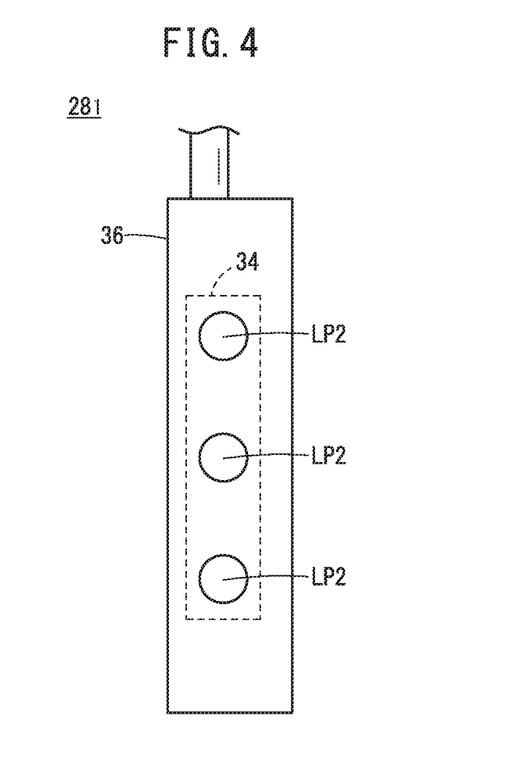
FIG. 4 is a diagram illustrating the external appearance of an I/O device.

Next, a description will be given with reference to FIG. 4 concerning the I/O device $28_1$. Moreover, since the I/O devices $28_2$ to $28_n$ have the same configuration as the I/O device $28_1$, description of the respective I/O devices $28_2$ to $28_n$ will be omitted.

The I/O device $28_1$ is a device for inputting and outputting various types of information. The I/O device $28_1$ outputs various types of information to the numerical control device, and also inputs information that is output from the numerical control device. It should be noted that the I/O devices $28_2$ to $28_n$ other than the I/O device $28_1$, which is the first I/O device connected to the numerical control device, exchange various types of information with the numerical control device via the I/O devices $28_1$ to $28_{(n-1)}$ located on the side closer to the numerical control device than themselves. The I/O device $28_1$ includes a state presentation unit 34 that indicates the state of the I/O device $28_1$.

The state presentation unit 34 includes lamps LP2, which correspond to a plurality of types of abnormalities, on the surface of a casing 36 of the I/O device $28_1$. According to the present embodiment, as the types of abnormalities, there are included a communication failure and a fuse disconnection.

In a state in which no abnormality has occurred (in a normal state), the I/O device $28_1$ turns on each of the plurality of lamps LP2 of the state presentation unit 34 in a first color. Consequently, the I/O device $28_1$ causes the state presentation unit 34 to present the fact that the I/O device $28_1$ is in a normal state.

In contrast thereto, in the case that an abnormality has been detected in at least one of a communication failure and a fuse disconnection, the I/O device $28_1$ causes the lamp LP2 corresponding to the type of detected abnormality to be turned on in a second color. Consequently, the I/O device $28_1$ causes the state presentation unit 34 to present the fact that an abnormality has occurred in the I/O device $28_1$, as well as the type of abnormality.

Moreover, in the case of the normal state, the I/O device $28_1$ may turn on (or turn off) each of the plurality of lamps LP2, and in the case that at least one of the abnormalities is detected, the I/O device $28_1$ may turn off (or turn on) the lamp LP2 corresponding to the type of detected abnormality.

In the case that an abnormality other than a communication failure is detected, the I/O device $28_1$ generates an abnormality signal indicating the abnormality, and outputs the generated abnormality signal to the numerical control device. It should be noted that the I/O devices $28_2$ to $28_n$ other than the I/O device $28_1$, which is the first I/O device connected to the numerical control device, output abnormality signals to the numerical control device via the I/O devices $28_1$ to $28_{(n-1)}$ located on the side closer to the numerical control device than themselves.

Figure 5:
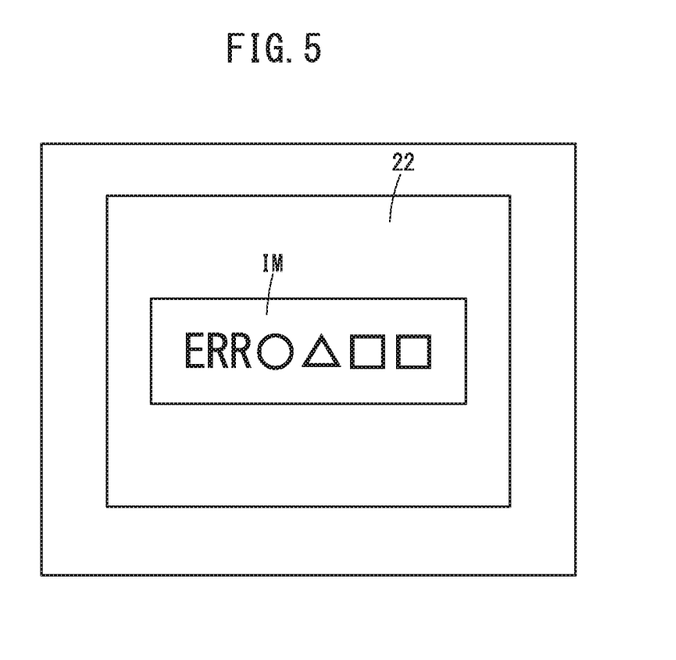
FIG. 5 is a diagram illustrating an error screen.

Next, with reference to FIG. 5, a description will be given concerning display processes for error screens IM which are executed by the respective numerical control devices of the plurality of machine tools 12. Moreover, since the display processes executed by each of the numerical control devices are the same, in this instance, a description will be given concerning the display process executed by a certain one of the numerical control devices.

In the case that the numerical control device recognizes an abnormality in itself, in the case that a failure to communicate with at least one of the plurality of electrical equipment connected in series to the numerical control device has occurred, or in the case that an abnormality signal has been received from at least one of the electrical equipment, the numerical control device displays the error screen IM on the display unit 22. On the error screen IM, symbols are depicted indicating the type of the electrical equipment in which an abnormality has occurred, the type of the abnormality, and the connected order of the electrical equipment in which the abnormality has occurred.

According to the present embodiment, as the types of electrical equipment in which an abnormality has occurred, there are included a "servo amplifier", an "I/O device", and a "numerical control device". On the error screen IM, in the case that an abnormality has occurred in a "servo amplifier", the symbol "A" is depicted in a portion "○" in the drawing, in the case that an abnormality has occurred in an "I/O device", the symbol "I" is depicted in the portion "○" in the drawing, and in the case that an abnormality has occurred in the "numerical control device", the symbol "C" is depicted in the portion "○" in the drawing.

According to the present embodiment, as the types of abnormalities, there are included a "power supply abnormality", a "communication abnormality", and a "temperature abnormality". On the error screen IM, in the case of a "power supply abnormality", the symbol "1" is depicted in a portion "Δ" in the drawing, in the case of a "communication abnormality", the symbol "2" is depicted in the portion "Δ" in the drawing, and in the case of a "temperature abnormality", the symbol "3" is depicted in the portion "Δ" in the drawing.

According to the present embodiment, as the connected order of the electrical equipment in which an abnormality has occurred, there are included a "servo amplifier connected order" and an "I/O device connected order". On the error screen IM, in the case that the electrical equipment in which an abnormality has occurred is included among a plurality of electrical equipment (the servo amplifiers $26_1$ to $26_m$ or the I/O devices $28_1$ to $28_n$) that are connected in a daisy chain, a number indicative of the order thereof from a side closest to the numerical control device is depicted in the symbols "□□" in the drawing.

Next, with reference to FIGS. 6 and 7, a description will be given concerning a process flow from the occurrence of an abnormality in the electrical equipment until an estimation result of the cause of the abnormality is obtained. Moreover, it will be assumed that, among the plurality of electrical equipment included in one of the machine tools 12, a communication failure abnormality has occurred in an I/O device $28_5$ that is a fifth I/O device connected to the numerical control device.

Figure 6:
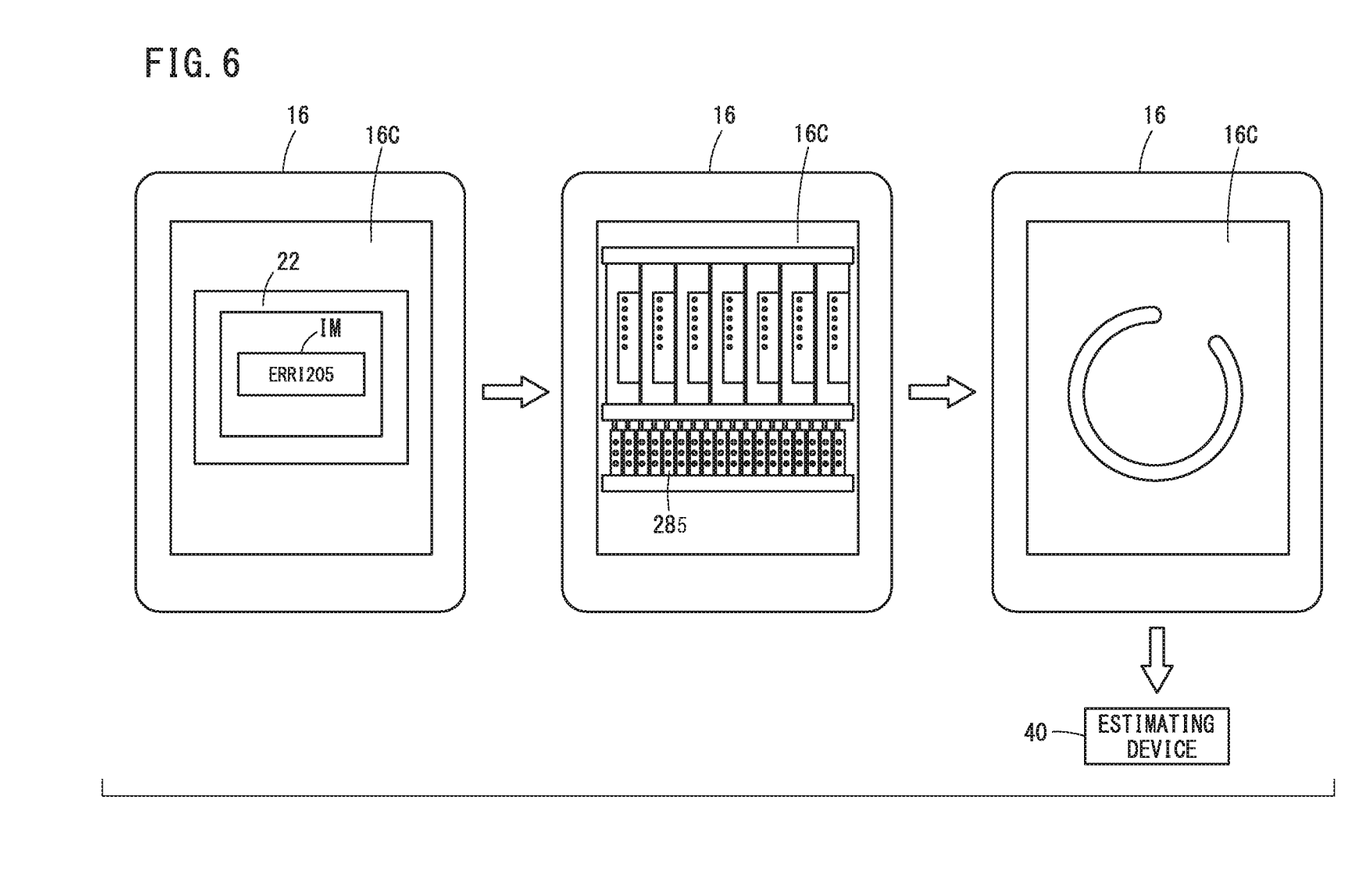
FIG. 6 is a diagram showing a process until the cause of an abnormality is estimated.

In the case that a communication failure abnormality has occurred in the I/O device $28_5$, an error screen IM in which the code "ERRI205" is depicted is displayed on the display unit 22 of the machine tool 12 (see FIG. 6). As was described above, the code "ERRI205" indicates that there is a communication abnormality in the fifth I/O device $28_5$ from the numerical control device. In accordance with an operation by an operator, the mobile terminal 16 captures an image of the error screen IM using the camera 16B (see FIG. 1), and saves a first captured image obtained as a result of capturing the image of the error screen IM.

Meanwhile, in the case that a communication failure abnormality has occurred in the I/O device $28_5$, the fact that communication is disabled is presented on the state presentation unit 34 in each of the fifth and subsequent I/O devices $28_5$ to $28_n$ from the numerical control device (see FIG. 6). In accordance with the operation by the operator, the mobile terminal 16 captures an image of the state presentation unit 34 of the fifth I/O device $28_5$ from the numerical control device and the surrounding vicinity thereof using the camera 16B (see FIG. 1), and saves a second captured image obtained as a result of capturing the image of the state presentation unit 34. Moreover, an image may be captured of the entire plurality of electrical equipment (the servo amplifiers $26_1$ to $26_m$ and the I/O devices $28_1$ to $28_n$) that are accommodated in the control panel 24.

When the mobile terminal 16 saves each of the first captured image and the second captured image, the mobile terminal 16 transmits, through the communication unit 16A (see FIG. 1), the saved first captured image and the saved second captured image to the estimating device 40 of the management server 14 (see FIG. 6).

Figure 7:
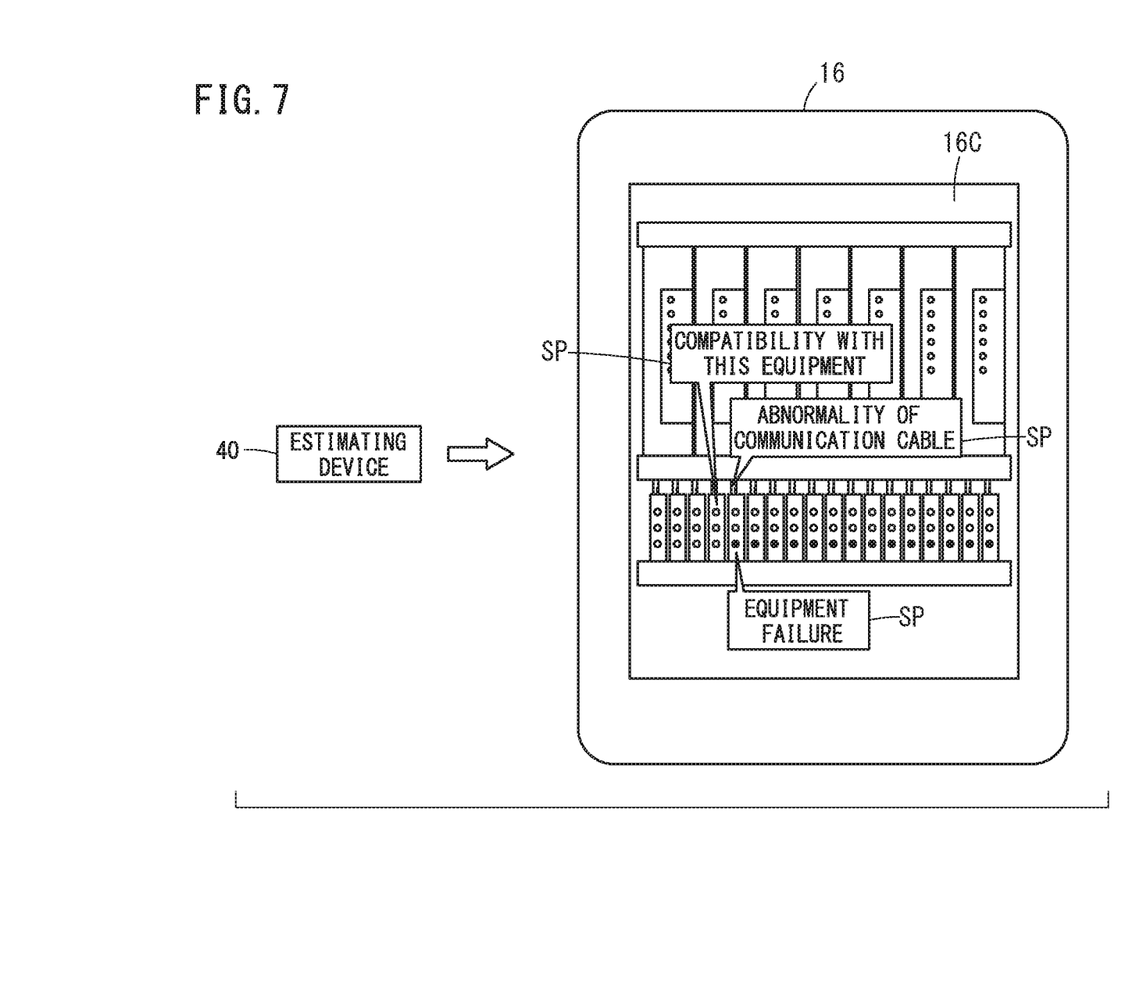
FIG. 7 is a diagram showing a display example of an estimation result.

When the estimating device 40 receives the first captured image and the second captured image transmitted from the mobile terminal 16, then using the first captured image and the second captured image that have been received, the estimating device 40 estimates the cause of the abnormality of the electrical equipment (the I/O device $28_5$) included in the machine tool 12 (see FIGS. 6 and 7). When the cause of the abnormality is estimated, the estimating device 40 causes the estimation result to be displayed on the display unit 16C (see FIG. 1) of the mobile terminal 16 that has transmitted the first captured image and the second captured image, and thereby issues a notification of the estimated cause of the abnormality (see FIG. 7).

According to the present embodiment, as illustrated in FIG. 7, a site image showing a location where the abnormality has occurred, and the vicinity around such a location is displayed. In accordance therewith, the operator can grasp the location in the site where the abnormality is occurring. Further, according to the present embodiment, as illustrated in FIG. 7, a speech balloon SP which indicates the cause of the abnormality is displayed in the site image with respect to the location where the abnormality has occurred. In accordance with this feature, the operator can grasp where and what type of factor has caused the abnormality at the site.

Figure 8:
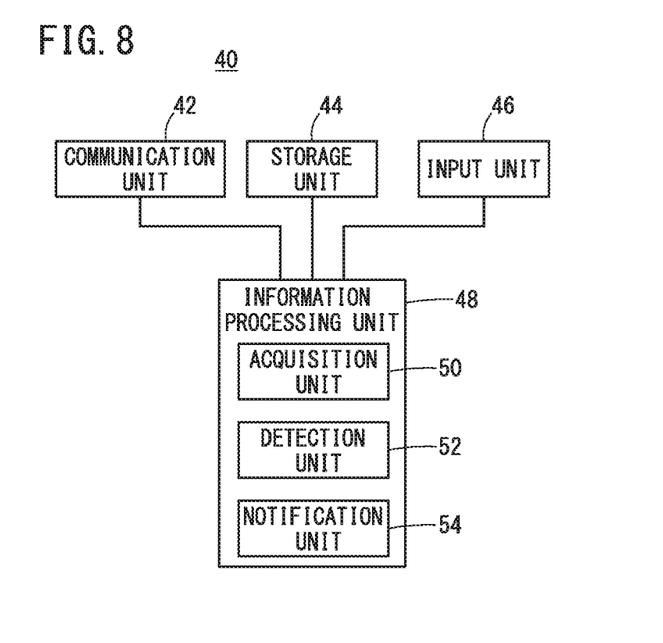
FIG. 8 is a block diagram showing the configuration of an estimating device.

Next, with reference to FIG. 8, a description will be given concerning the estimating device 40. The estimating device 40 includes a communication unit 42 that communicates with the communication unit 16A of the mobile terminal 16 (see FIG. 1), a storage unit 44 that stores information, an input unit 46 that inputs information, and an information processing unit 48 that processes information.

An estimation program for estimating the cause of an abnormality of the electrical equipment included in the machine tools 12 is stored in the storage unit 44. Further, in the storage unit 44, a plurality of state history information showing, as a history, the state of the electrical equipment in which an abnormality has occurred, and a plurality of cause history information showing, as a history, the cause of the abnormality are stored in advance in a one-to-one correspondence with each other.

According to the present embodiment, each of the plurality of state history information includes the type of the electrical equipment in which an abnormality has occurred, the type of the abnormality, and the connected order of the electrical equipment in which the abnormality has occurred. Moreover, each of the plurality of state history information may be information that shows, as a history, the state of the electrical equipment in which an abnormality has actually occurred in the past, or may be information that shows, as a history, the state of the electrical equipment in which an abnormality obtained on the basis of a simulation has occurred.

According to the present embodiment, each of the plurality of cause history information includes a site image showing a location where the cause of an abnormality has occurred, and the vicinity around such a location.

Moreover, each of the plurality of cause history information may be information that shows, as a history, the cause of an abnormality as ascertained from the electrical equipment in which the abnormality has actually occurred, or may be information that shows, as a history, the cause of an abnormality which is obtained on the basis of a simulation.

The information processing unit 48 includes a processor such as a CPU (Central Processing Unit) or an MPU (Micro Processing Unit). By the processor executing the estimation program that is stored in the storage unit 44, the information processing unit 48 functions as an acquisition unit 50, a detection unit 52, and a notification unit 54.

The acquisition unit 50 acquires state information indicating the state of the electrical equipment in which an abnormality has occurred. In the case that the communication unit 42 has received the first captured image and the second captured image which are transmitted from the mobile terminal 16, the acquisition unit 50 imports the first captured image and the second captured image from the communication unit 42.

When the acquisition unit 50 imports the first captured image and the second captured image, the acquisition unit 50 recognizes the state of the electrical equipment in which an abnormality has occurred, from the first captured image and the second captured image that have been imported, and acquires the state information on the basis of such a recognition result. According to the present embodiment, the state information includes the type of the electrical equipment in which an abnormality has occurred, the type of the abnormality, and the connected order of the electrical equipment in which the abnormality has occurred.

Moreover, the acquisition unit 50 recognizes the type of the electrical equipment in which an abnormality has occurred, the type of the abnormality, and the connected order of the electrical equipment in which the abnormality has occurred, from the code depicted on the error screen IM within the first captured image, and the states of the lamps LP1 and LP2 of the state presentation units 30 and 34 within the second captured image.

The detection unit 52 detects, from among the plurality of state history information that are stored in the storage unit 44, at least one of the state history information that is similar to the state information acquired by the acquisition unit 50. When the acquisition unit 50 acquires the state information, the detection unit 52 reads out the plurality of state history information that are stored in the storage unit 44, and compares each of the plurality of state history information which have been read out with the state information acquired by the acquisition unit 50, to thereby detect the state history information that is similar to the state information.

For example, the detection unit 52 detects at least one of the state history information that is most consistent with the type of the electrical equipment in which an abnormality has occurred, the type of the abnormality, and the connected order of the electrical equipment in which the abnormality has occurred, which are included as the state information acquired by the acquisition unit 50. Moreover, the detection unit 52 may detect at least one of the state history information with a predetermined threshold value or less.

The notification unit 54 issues a notification of the cause of the abnormality, on the basis of the cause history information that is associated with the state history information detected by the detection unit 52. When the detection unit 52 detects the state history information, the notification unit 54 reads out, from the storage unit 44, the cause history information that is associated with the state history information.

Further, in the case that the detection unit 52 detects two or more of the state history information, the notification unit 54 reads out, from the storage unit 44, the cause history information associated with each of the two or more of the state history information detected by the detection unit 52.

Upon reading out the cause history information from the storage unit 44, the notification unit 54 generates a display control signal for displaying, on the display unit 16C of the mobile terminal 16 (see FIG. 1), the cause of the abnormality indicated by the cause history information that has been read out. By transmitting, through the communication unit 42, the generated display control signal to the mobile terminal 16, which is a transmission destination for the first captured image and the second captured image, the notification unit 54 causes the display unit 16C to display the cause of the abnormality, which is indicated by the state history information detected by the detection unit 52.

Moreover, according to the present embodiment, as shown in FIG. 7, the notification unit 54 causes the display unit 16C to display the site image, and causes the speech balloon SP, which indicates the cause of the abnormality, to be displayed within the site image. In the case that the detection unit 52 detects two or more of the state history information, a plurality of the speech balloons SP are displayed within the site image as shown in FIG. 7.

Figure 9:
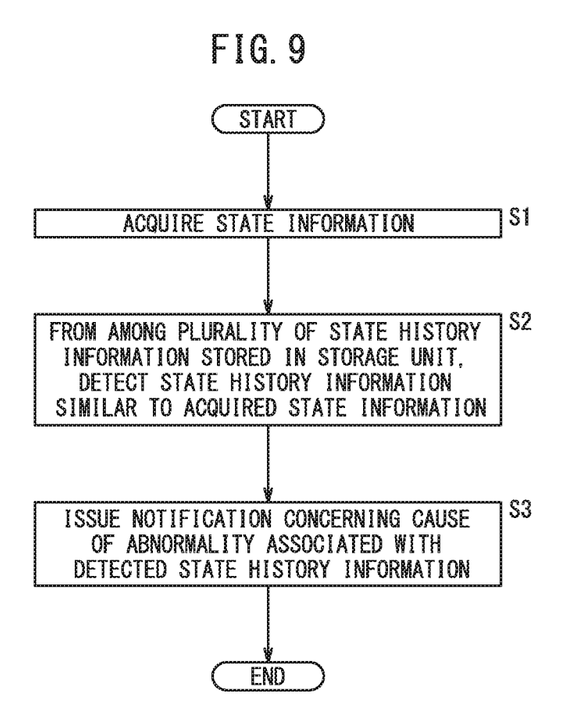
FIG. 9 is a flowchart showing the process flow of an estimation process of the estimating device.

Next, in relation to an estimation method of the estimating device 40, a process flow of an estimation process performed by the estimating device 40 will be described with reference to FIG. 9. When the communication unit 42 receives the first captured image and the second captured image which are transmitted from the mobile terminal 16, the estimation process transitions to step S.

In step S1, the acquisition unit 50 imports, from the communication unit 42, the first captured image and the second captured image which have been transmitted from the mobile terminal 16, and acquires the state information on the basis of the first captured image and the second captured image that have been imported. When the acquisition unit 50 acquires the state information, the estimation process transitions to step S2.

In step S2, from among the plurality of state history information that are stored in the storage unit 44, the detection unit 52 detects at least one of the state history information that is similar to the state information acquired by the acquisition unit 50. When the detection unit 52 detects at least one of the state history information, the estimation process transitions to step S3.

In step S3, the notification unit 54 generates a display control signal on the basis of the cause history information that is associated with the state history information detected by the detection unit 52, and transmits the generated display control signal to the mobile terminal 16, which is the transmission destination for the first captured image and the second captured image. When the notification unit 54 transmits the display control signal to the mobile terminal 16, the estimation process is brought to an end. Moreover, on the basis of the display control signal, the mobile terminal 16 displays on the display unit 16C the cause of the abnormality indicated by the state history information detected by the detection unit 52, whereby a notification is issued concerning the cause of the abnormality.

[Modifications]

Although the above-described embodiment has been described as an example of the present invention, the technical scope of the present invention is not limited to the scope described in relation to the above-described embodiment. It goes without saying that various modifications or improvements are capable of being added to the above-described embodiment. It is clear from the scope of the claims that other modes to which such modifications or improvements have been added can be included within the technical scope of the present invention.

(Modification 1)

According to the above-described embodiment, the estimating device 40 is disposed in the management server 14. However, the estimating device 40 may be disposed only in one of the numerical control devices that are respectively included in the plurality of machine tools 12. In this case, the numerical control device in which the estimating device 40 is disposed is capable of estimating the cause of an abnormality of the electrical equipment included in each of the plurality of machine tools 12 via the network NT.

Further, the estimating device 40 may be disposed in each of the numerical control devices that are respectively included in the plurality of machine tools 12. In this case, the mobile terminal 16 is connected so as to be capable of communicating with each of the numerical control devices. Each of the numerical control devices is capable of estimating the cause of an abnormality of the electrical equipment included in a corresponding one of the machine tools 12 without going through the network NT. Moreover, one mobile terminal 16 may be arranged for each of the plurality of numerical control devices.

Further, a portion of the estimating device 40 may be disposed in each of the numerical control devices that are respectively included in the plurality of machine tools 12. For example, the acquisition unit 50 may be disposed in each of the numerical control devices, whereas the communication unit 42, the storage unit 44, the input unit 46, the detection unit 52, and the notification unit 54 may be disposed in the management server 14. In this case, the mobile terminal 16 is connected so as to be capable of communicating with each of the numerical control devices. In such an example, since the acquisition units 50 are disposed in the numerical control devices, the processing load on the management server 14 can be reduced, in comparison with a case in which the acquisition unit 50 is disposed in the management server 14.

(Modification 2)

According to the present embodiment, the acquisition unit 50 recognizes the state of the electrical equipment in which an abnormality has occurred from the first captured image and the second captured image, and acquires the state information on the basis of such a recognition result. However, the acquisition unit 50 may recognize the state of the electrical equipment in which an abnormality has occurred from one of the first captured image and the second captured image, and may acquire the state information on the basis of such a recognition result.

Further, in the case that an abnormality signal generated by the electrical equipment included in the machine tool 12 can be received from the communication unit 42, the acquisition unit 50 may recognize the state of the electrical equipment in which the abnormality has occurred from the abnormality signal, and may acquire the state information on the basis of such a recognition result.

Further, in the case that the state of the electrical equipment in which an abnormality has occurred is capable of being input from the input unit 46 in accordance with an input operation made by the operator of the management server 14, the acquisition unit 50 may acquire the state information on the basis of the state of the electrical equipment in which the abnormality has occurred which was input from the input unit 46.

(Modification 3)

According to the above-described embodiment, the notification unit 54 causes the site image, which shows the location where the abnormality has occurred and the vicinity around such a location, to be displayed on the display unit 16C, and causes the speech balloon SP, which indicates the cause of the abnormality at the location, to be displayed in the site image. However, the notification unit 54 may cause only characters indicating the cause of the abnormality to be displayed on the display unit 16C, or may cause a voice message indicating the cause of the abnormality to be generated from a speaker of the mobile terminal 16.

Further, the notification unit 54 may cause the site image to be displayed in a state in which the location where the abnormality has occurred, which is shown within the site image, is capable of being distinguished. For example, the notification unit 54 causes the site image to be displayed in a state in which the location where the abnormality has occurred, which is shown within the site image, is displayed in a flashing or blinking manner. As a result, it is possible to grasp where and what type of factor has caused the abnormality at the site. In particular, in the case that a mistaken connection of the plurality of electrical equipment (the servo amplifiers $26_1$ to $26_m$ and the I/O devices $28_1$ to $28_n$) that are connected in series has caused the abnormality, or alternatively, in the case that a disconnection of a wiring cable for connecting the electrical equipment has caused the abnormality, the operator is capable of easily grasping the cause.

(Modification 4)

The above-described embodiment and the modifications thereof may be arbitrarily combined within a range in which no technical inconsistencies occur.

Inventions Capable of being Grasped from the Above-Described Embodiment and Modifications Inventions that can be grasped from the above-described embodiments and the modifications thereof will be described below.

First Invention

The first invention is characterized by the estimating device (40) that estimates the cause of an abnormality of electrical equipment included in the machine tool (12), the estimating device comprising:

the storage unit (44) that stores, in association with each other, the state history information showing, as a history, the state of the electrical equipment in which an abnormality has occurred, and the cause history information showing, as a history, a cause of the abnormality;

the acquisition unit (50) that acquires the state information indicating the state of the electrical equipment in which the abnormality has occurred;

the detection unit (52) that detects, from among a plurality of the state history information stored in the storage unit (44), at least one of the state history information that is similar to the state information acquired by the acquisition unit (50); and the notification unit (54) that issues a notification concerning the cause of the abnormality, on the basis of the cause history information that is associated with the state history information detected by the detection unit (52).

In accordance with this estimating device (40), since a notification is issued concerning the cause of an abnormality associated with the state of the electrical equipment in which such an abnormality has occurred, the cause of the abnormality can be easily investigated.

The acquisition unit (50) may acquire the state information on the basis of the first captured image, which is obtained as a result of capturing the image of the error screen (IM) displayed on the display unit (22) of the machine tool (12), and the second captured image, which is obtained as a result of capturing the image of the state presentation units (30 and 34) that present the state of the electrical equipment in which the abnormality has occurred. In accordance with this feature, it is possible to accurately acquire the state information indicating the state of the electrical equipment in which the abnormality has actually occurred.

The acquisition unit (50) may acquire the state information on the basis of the first captured image and the second captured image, which are captured by the mobile terminal (16), and are transmitted from the mobile terminal (16), and the notification unit (54) may cause the display unit (16C) of the mobile terminal (16) to display the cause of the abnormality. In accordance with this feature, it is possible for the operator to easily grasp the cause of the abnormality using the mobile terminal (16).

The cause history information may include a site image showing the location where the abnormality has occurred, and a vicinity around the location, and the notification unit (54) may cause the site image to be displayed. In accordance with this feature, the operator can grasp the location in the site where the abnormality is occurring.

The notification unit (54) may cause a speech balloon (SP) indicating the cause of the abnormality at the location to be displayed in the site image. In accordance with this feature, the operator can grasp where and what type of factor has caused the abnormality at the site.

The notification unit (54) may cause the site image to be displayed in a state in which the location is capable of being distinguished within the site image. In accordance with this feature, the operator can grasp where and what type of factor has caused the abnormality at the site.

Moreover, the estimating device (40) may be a numerical control device that controls the machine tool main body, or may be a device that differs from the numerical control device that controls the machine tool main body.

Second Invention

The second invention is characterized by the system equipped with the plurality of machine tools (12), the management server (14) that manages each of the plurality of machine tools (12), and the mobile terminal (16) that is capable of communicating with at least one of the management server (14) and the plurality of machine tools (12), the system comprising:

the storage unit (44) that stores in association with each other the state history information showing, as a history, a state of electrical equipment which is included in each of the machine tools and in which an abnormality has occurred, and the cause history information showing, as a history, a cause of the abnormality;

the acquisition unit (50) that acquires the state information indicating the state of the electrical equipment which is included in each of the machine tools and in which the abnormality has occurred;

a detection unit (52) that detects, from among a plurality of the state history information stored in the storage unit (44), at least one of the state history information that is similar to the state information acquired by the acquisition unit (50); and the notification unit (54) that issues a notification concerning the cause of the abnormality, on the basis of the cause history information that is associated with the state history information detected by the detection unit (52).

In accordance with such a system (10), since a notification is issued concerning the cause of an abnormality associated with the state of the electrical equipment in which such an abnormality has occurred, the cause of the abnormality can be easily investigated.

The acquisition unit (50) may acquire the state information on the basis of the first captured image, which is obtained as a result of capturing the image of the error screen (IM) displayed on the display unit (22) of the machine tool (12), and the second captured image, which is obtained as a result of capturing the image of the state presentation units (30 and 34) that present the state of the electrical equipment in which the abnormality has occurred. In accordance with this feature, it is possible to accurately acquire the state information indicating the state of the electrical equipment in which the abnormality has actually occurred.

The acquisition unit (50) may acquire the state information on the basis of the first captured image and the second captured image, which are captured by the mobile terminal (16), and are transmitted from the mobile terminal (16), and the notification unit (54) may cause the display unit (16C) of the mobile terminal (16) to display the cause of the abnormality. In accordance with this feature, it is possible for the operator to easily grasp the cause of the abnormality using the mobile terminal (16).

The cause history information may include a site image showing the location where the abnormality has occurred, and a vicinity around the location, and the notification unit (54) may cause the site image to be displayed. In accordance with this feature, the operator can grasp the location in the site where the abnormality is occurring.

The notification unit (54) may cause a speech balloon (SP) indicating the cause of the abnormality at the location to be displayed in the site image. In accordance with this feature, the operator can grasp the location in the site where the abnormality is occurring.

The notification unit (54) may cause the site image to be displayed in a state in which the location is capable of being distinguished within the site image. In accordance with this feature, the operator can grasp where and what type of factor has caused the abnormality at the site.

What is claimed is:

1. An estimating device that estimates a cause of an abnormality of electrical equipment included in a machine tool, the estimating device comprising:
    a storage unit configured to store in association with each other state history information showing, as a history, a state of the electrical equipment in which an abnormality has occurred, and cause history information showing, as a history, a cause of the abnormality;
    an acquisition unit configured to acquire state information indicating the state of the electrical equipment in which the abnormality has occurred;
    a detection unit configured to detect, from among a plurality of the state history information stored in the storage unit, at least one of the state history information that is similar to the state information acquired by the acquisition unit; and
    a notification unit configured to issue a notification concerning the cause of the abnormality, on a basis of the cause history information that is associated with the state history information detected by the detection unit.

2. The estimating device according to claim 1, wherein the acquisition unit acquires the state information on a basis of a first captured image obtained as a result of capturing an image of an error screen displayed on a display unit of the machine tool, and a second captured image obtained as a result of capturing an image of a state presentation unit configured to present a state of the electrical equipment in which an abnormality has occurred.

3. The estimating device according to claim 2, wherein:
    the acquisition unit acquires the state information on a basis of the first captured image and the second captured image, which are captured by a mobile terminal, and are transmitted from the mobile terminal; and
    the notification unit causes a display unit of the mobile terminal to display the cause of the abnormality.

4. The estimating device according to claim 1, wherein:
    the cause history information includes a site image showing a location where the abnormality has occurred, and a vicinity around the location; and
    the notification unit causes the site image to be displayed.

5. The estimating device according to claim 4, wherein the notification unit causes a speech balloon indicating the cause of the abnormality at the location to be displayed in the site image.

6. The estimating device according to claim 4, wherein the notification unit causes the site image to be displayed in a state in which the location is allowed to be distinguished within the site image.

7. The estimating device according to claim 1, wherein the estimating device is a numerical control device configured to control a machine tool main body.

8. The estimating device according to claim 1, wherein the estimating device is a device that differs from a numerical control device configured to control a machine tool main body.

9. A system equipped with a plurality of machine tools, a management server configured to manage each of the plurality of machine tools, and a mobile terminal configured to communicate with at least one of the management server and the plurality of machine tools, the system comprising:
    a storage unit configured to store in association with each other state history information showing, as a history, a state of electrical equipment which is included in each of the machine tools and in which an abnormality has occurred, and cause history information showing, as a history, a cause of the abnormality;
    an acquisition unit configured to acquire state information indicating the state of the electrical equipment which is included in each of the machine tools and in which the abnormality has occurred;
    a detection unit configured to detect, from among a plurality of the state history information stored in the storage unit, at least one of the state history information that is similar to the state information acquired by the acquisition unit; and
    a notification unit configured to issue a notification concerning the cause of the abnormality, on a basis of the cause history information that is associated with the state history information detected by the detection unit.

10. The system according to claim 9, wherein the acquisition unit acquires the state information on a basis of a first captured image obtained as a result of capturing an image of an error screen displayed on a display unit of the machine tool, and a second captured image obtained as a result of capturing an image of a state presentation unit configured to present a state of the electrical equipment in which an abnormality has occurred.

11. The system according to claim 10, wherein:
    the acquisition unit acquires the state information on a basis of the first captured image and the second captured image, which are captured by the mobile terminal, and are transmitted from the mobile terminal; and
    the notification unit causes a display unit of the mobile terminal to display the cause of the abnormality.

12. The system according to claim 9, wherein:
    the cause history information includes a site image showing a location where the abnormality has occurred, and a vicinity around the location; and
    the notification unit causes the site image to be displayed.

13. The system according to claim 12, wherein the notification unit causes a speech balloon indicating the cause of the abnormality at the location to be displayed in the site image.

14. The system according to claim 12, wherein the notification unit causes the site image to be displayed in a state in which the location is allowed to be distinguished within the site image.

\* \* \* \* \*